March 2, 1937.  J. R. GALT  2,072,812
ELECTRICAL CIRCUIT TIMER
Filed Dec. 4, 1936  2 Sheets-Sheet 1

INVENTOR.
John R. Galt
BY
Thomas W. Dane
ATTORNEY.

March 2, 1937.　　　J. R. GALT　　　2,072,812
ELECTRICAL CIRCUIT TIMER
Filed Dec. 4, 1936　　　2 Sheets-Sheet 2
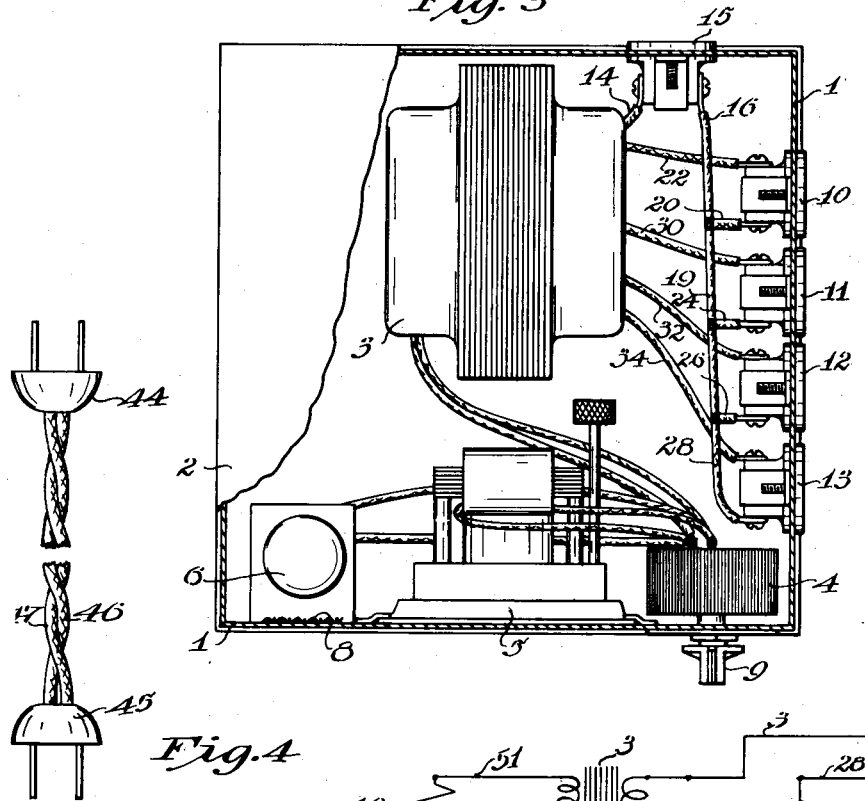
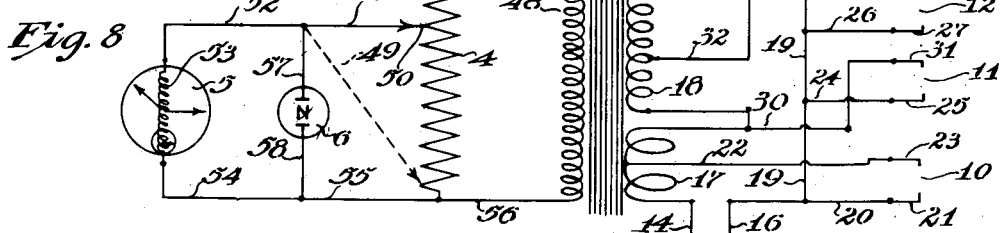
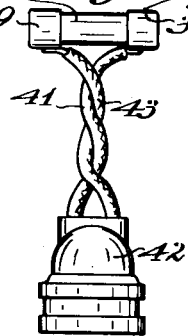
INVENTOR.
John R. Galt
BY
ATTORNEY.

Patented Mar. 2, 1937

2,072,812

UNITED STATES PATENT OFFICE 2,072,812

ELECTRICAL CIRCUIT TIMER

John R. Galt, St. Paul, Minn., assignor of fifteen per cent to Cyrus C. De Coster, St. Paul, Minn.

Application December 4, 1936, Serial No. 114,187

4 Claims. (Cl. 161—15)

The present invention relates to an electrical circuit timer.

Various mechanisms have been developed for timing the length of operation of an electrical circuit but most of such devices are either not sufficiently flexible to permit checking of all ordinary circuits and wattages in general use, or are so complicated as to be beyond the ability of any but an electrical engineer to satisfactorily employ and interpret.

There are, of course, today numerous electrical devices having automatic on and off operation, the time of operation of which it is desired to check, such as oil burners, electric refrigerators, air conditioning equipment, various types of automatic electrical heaters, motors and various other electrical devices familiar to the art.

An object of the present invention is to make a simple and efficient electric circuit timer in which the total running time of an electrical device is registered.

Another object of the invention is to make an electric circuit timer having a tapped primary coil and a variable secondary circuit, the primary coil being adapted to be connected to loads of different voltages and amperages and the secondary circuit having a registering mechanism embodied therein with indicating means connected in parallel with the registering mechanism to indicate a voltage value applied to the registering mechanism.

Another object is to make an improved and simplified electric circuit timing mechanism.

In order to attain these objects there is provided, in accordance with one feature of the invention, a transformer coil having a plurality of taps connectible to circuits of different wattages, and a secondary coil connected across a potential controlling device to a time registering mechanism, said secondary circuit having an indicating device mounted therein to indicate the value of the voltage applied to the registering device.

Figure 1:
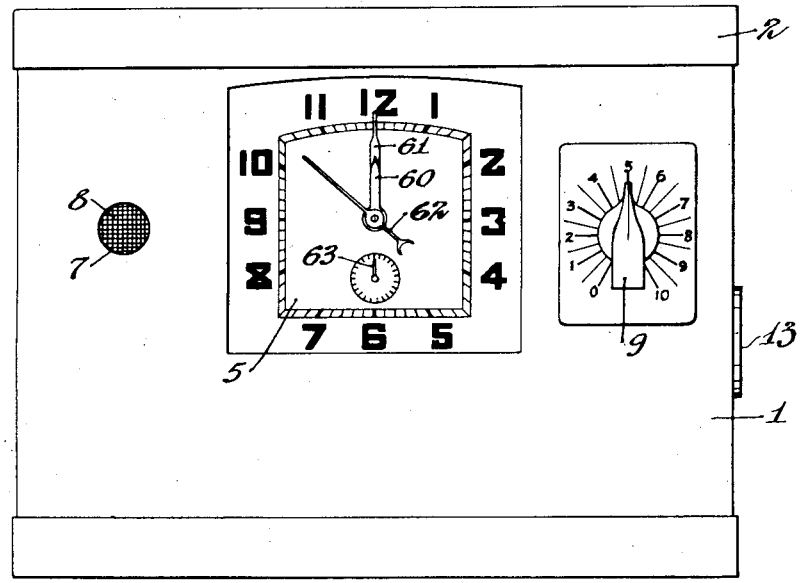
Figure 2:
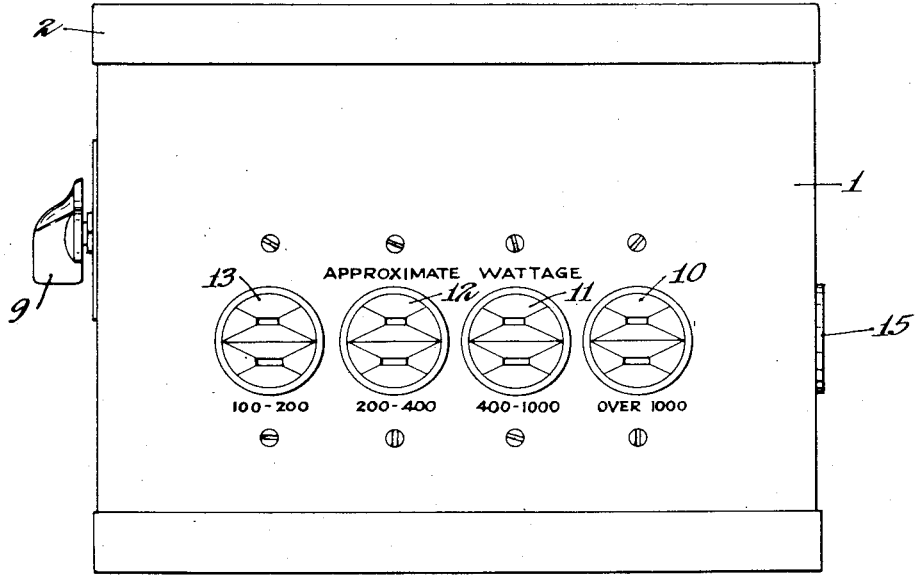

These and other features of the invention will be more fully brought out in the following description and in the accompanying drawings, wherein:

Figure 1 is a view in front elevation of a device embodying the present invention, Figure 2 is a view in side elevation of the device shown in Figure 1, Figure 3 is a plan view of the device shown in Figures 1 and 2 a portion of a cover being broken away to show the interior construction, Figure 4 is a schematic circuit drawing showing the arrangement and electrical connections of the various parts comprising the device, Figure 5 is a view in side elevation of a plug socket and connector for connecting the device into a fused permanently wired circuit, Figure 6 is a view in side elevation of a shorted plug used in closing a circuit when the connector illustrated in Figure 5 is employed, Figure 7 is a bottom view of the shorted plug illustrated in Figure 6, and, Figure 8 is a view in side elevation of an extension cord used in connecting the timing mechanism to a circuit to be tested.

Referring to the drawings in detail a cabinet 1 is constructed of sheet metal with a flanged removable cover 2 fitting over the open upper end of the cabinet 1. A transformer 3 is mounted within the cabinet and a rheostat 4, a self-starting electrical clock 5 and a neon light 6 are mounted on the front wall of the cabinet 1. An opening 7 is cut into the front wall of the cabinet and a piece of wire mesh 8 is mounted across the opening 7 to protect the neon bulb 6 which is mounted in rear of the opening 7 to be visible therethrough.

An operating handle 9 of the rheostat 4 projects through the front of the cabinet 1 to permit manipulation of the rheostat by an operator. The primary circuit of the transformer 3 is tapped and the leads from these taps are brought out one to each of four plug sockets numbered 10, 11, 12 and 13 respectively. One terminal 14 of the primary coil (see Figures 3 and 4) is carried to a plug socket 15 preferably mounted in the rear face of the cabinet. From the other terminal of the plug socket 15 a conductor 16 is connected in common to one terminal of each of the plug sockets 10 to 13 inclusive. From each of the other terminals of each of the sockets 10 to 13 inclusive a conductor is connected to a tapping on the primary coil of the transformer in a manner to be fully set forth in the following description of the circuit.

Referring to the circuit illustrated in Figure 4 the primary coil of the transformer 3 is divided into two principal parts comprising a portion 17 having but a few turns of heavy wire and having a portion 18 comprising several turns of lighter wire connected in series with the winding 17. One terminal of the heavy winding 17 is connected by the conductor 14 to one side of the plug socket 15 mounted on the rear face of the cabinet 1. From the other terminal of the socket 15 the conductor 16 is connected by means of a conductor 20 to one terminal 21 of the socket 10. A conductor 22 is tapped into the heavy portion 17 of the primary coil and is connected to the other terminal 23 of the plug socket 10.

The conductor 16 is connected in common to one side of each of the sockets 10 to 13 inclusive by means of a wire 19, from which a conductor 24 is connected to a terminal 25 of the socket 11, a conductor 26 is connected to a contact member 27 of the socket 12 and a conductor 28 is connected to a contact member 29 of the socket 13.

A conductor 30 is tapped into the primary winding, preferably at the junction of the heavy winding 17 and the lighter winding 18. This conductor 30 is connected to a contact member 31 of the socket 11. A conductor 32 is tapped into the primary winding substantially midway of the lighter winding 18 and the conductor 32 is connected to a contact member 33 of the socket 12. At the opposite end of the lighter winding 18, a conductor 34 is connected to a contact member 35 of the socket 13.

A shorted plug 36 is adapted to be inserted in the rear socket 15, and when so inserted it electrically connects the conductors 14 and 16. This plug 36 is inserted in the socket 15 when the device to be timed is permanently connected, as by means of electrical conduit, to the electrical device to be timed. Such permanently wired devices are always connected through a fused circuit and when it is desired to connect the present timing device into such a circuit, one of the fuses in the circuit is removed and a connecting element 37 (see Figure 5) is inserted in the fuse clip from which the fuse has been removed.

The connector 37 is shaped similarly to a fuse and has two electrically conductive end members 38 and 39 which are separated by a tube or bar 40 of insulative material. If desired an ordinary fuse holder of the type used in the circuit to be tested can be used with the fusible element removed therefrom. From the conductive end portion 38 a conductor 41 is connected to one contact of a plug socket 42 and the other conductive end portion 39 is connected by means of a conductor 43, to the opposite contact member of the plug 42.

An extension cord shown in Figure 8 comprises a pair of contact plugs 44 and 45 connected by conductors 46 and 47 each of which is connected to one of the contact prongs of each of the plugs 44 and 45. In connecting the timer to a permanently wired, fused circuit one of the fuses in said circuit is replaced by the connector 37, and the plug 44 is inserted in the socket 42. If the approximate wattage of the load is known the plug 45 is then inserted in socket 10 to 13 having an indicated wattage closest to that of the load to be tested. It will be noted that, as the present device is wired, the circuit from the plug socket 10 is wired through only a small part of the primary coil of the transformer 3 and would therefore induce a relatively small proportional current in a secondary winding 48 of the transformer. This socket 10 therefore would handle loads of well over 1,000 watts. The socket 11 being wired through the entire heavy winding of the primary would, in the transformer here illustrated, handle loads having a wattage between 400 and 1,000. The socket 12 having the entire heavy winding of the primary as well as part of the lighter winding thereof in circuit therewith would handle loads between 200 and 400 watts and the socket 13 including both windings 17 and 18 would handle lighter loads between 100 and 200 watts.

Before completing the circuit through the timing mechanism the rheostat should be turned to the zero setting. In this position a conductor 49 connected to a movable contact member 50 having engagement with the rheostat coil 4 would be in the dotted line position indicated in Figure 4 so that the resistance coil 4 would be shunted across the secondary winding 48 and none of the induced voltage of the secondary would flow through the neon lamp 6 or the registering mechanism 5. On turning the control handle 9 of the rheostat the contact member 50 would be moved toward a conductor 51 which connects one terminal of the secondary coil 48 to one terminal of the rheostat winding 4. In this manner more and more of the secondary voltage would flow through the neon lamp 6 and the timing mechanism 5. When this induced voltage is sufficient to light the neon lamp a sufficient amount of voltage would be impressed on the timing mechanism 5 to operate it accurately. When this point is reached current will flow from the movable contact 50 through the conductor 49 through a conductor 52 through an operating coil 53 of the timing mechanism and thence through conductors 54, 55 and 56 to the opposite terminal of the secondary winding 48. The neon lamp is shunted across the variable resistance 4 and is in parallel with the registering mechanism. The one half watt neon bulb has an ignition point on alternating current of approximately 90 volts. Therefore when the lamp glows brilliantly it is known that at least 90 volts is impressed across the motor winding and the clock will be operating accurately.

When it is desired to time a circuit the approximate wattage of which is not known it is advisable to start by inserting the plug 45 in the socket 10 with the rheostat handle in zero position and then gradually advance the position of the handle 9 to remove the resistant shunt across the secondary as previously described until the neon light 6 glows brightly. If this does not occur with the plug in the socket 10 the rheostat should again be restored to the zero setting and the plug advanced to socket 11 and the procedure repeated. This may be continued through the sockets 12 and 13 until the desired secondary current is attained to light the lamp 6.

If the device to be tested is of the plug-in type such as some types of electrical refrigerators and other devices the shorting plug 36 is removed from the socket 15, with the plug 44 plugged into a wall receptacle not shown of an ordinary type, the other plug 45 is plugged into the socket 15. The plug from the mechanism to be tested is then plugged into the required socket, either 10, 11, 12 or 13 depending upon the load, and the rheostat is operated by means of the handle 9 as above described to produce the required secondary voltage through the timing mechanism and the neon lamp.

The timing mechanism as here illustrated is simply an electric clock of the self-starting type having a conventional hour hand 60, a minute hand 61 and a sweep second hand 62. An additional recording dial is here illustrated and comprises a hand 63 in a dial having 20 divisions and is geared to the other hands by suitable gearing (not shown) so that for each complete cycle of the hour hand 60 the recording hand 63 advances one division. In this way a testing period of ten days would be provided and would be accurate to the second. A further advantage of this recording device lies in the fact that any layman who can tell time could immediately and accurately interpret the reading.

I claim:

1. An electric circuit timer comprising in combination a transformer having a plurality of related, series connected, primary windings, means adapted to selectively connect said windings to an energizing circuit, a secondary winding, a variable impedance connected across the terminals of said secondary winding, a synchronous motor connected from a variable element of said impedance, a time indicating device operatively connected to said motor and an electrically actuated indicating element having an actuating voltage substantially equal to that of said synchronous motor and connected in parallel therewith.

2. An electric circuit timer comprising in combination a transformer having a plurality of related, series connected, primary windings, a portion of said primary windings being of heavy wire with a relatively small number of turns, a second portion of said primary winding being of lighter wire with a relatively large number of turns, connecting means mounted to selectively connect said windings to an energizing circuit, a secondary winding, an impedance connected across the terminals of said secondary winding a synchronous motor having one terminal thereof connected to one terminal of said secondary winding, a movable contact member electrically connected to the opposite terminal of said synchronous motor and having variable connection with said impedance, and an indicating element having an actuating voltage substantially equal to that of said synchronous motor and connected in parallel therewith.

3. An electric circuit timer comprising in combination a transformer having a plurality of related series connected primary windings adapted to varying load conditions, contact means mounted to selectively connect said primary windings to a load proportionate to said windings, a secondary winding, an impedance connected across the terminals of said secondary winding, a synchronous motor having a time indicating mechanism operatively connected thereto, a conductor connecting one terminal of said synchronous motor to said secondary circuit, a second conductor connected to the other terminal of said motor and having a contact element adjustably connected to said impedance, and a voltage indicating device connected in parallel with said synchronous motor.

4. An electric circuit timer comprising in combination a transformer having a plurality of related series connected primary windings, a plurality of conductors tapped into said primary windings and selectively connected to a basic primary element to energize all of said sockets when connected to a source of electrical energy, a secondary winding, an impedance connected across the terminals of said secondary winding, a variable contact member operatively associated with said impedance, an electric time indicating mechanism having one terminal thereof electrically connected to said contact member, the other terminal of said time indicating mechanism being electrically connected to said secondary winding, and voltage indicating means connected in parallel with said indicating mechanism.

JOHN R. GALT.